United States Patent [19]

Mao

[11] 4,006,035
[45] Feb. 1, 1977

[54] MAINTENANCE-FREE BATTERY AND METHOD FOR REDUCING THE CURRENT DRAW OF SUCH BATTERIES

[75] Inventor: George W. Mao, St. Paul, Minn.

[73] Assignee: Gould Inc., Rolling Meadows, Ill.

[22] Filed: Dec. 12, 1975

[21] Appl. No.: 640,192

Related U.S. Application Data

[63] Continuation-in-part of Ser. No. 514,023, Oct. 11, 1974, abandoned.

[52] U.S. Cl. ................................ 429/72; 429/205; 429/226
[51] Int. Cl.² ........................................ H01M 4/36
[58] Field of Search ...................... 136/26, 27, 154

[56] References Cited

UNITED STATES PATENTS

| 368,608 | 8/1887 | Peyrusson | 136/26 |
|---|---|---|---|
| 528,648 | 11/1894 | Reed | 136/154 |
| 623,195 | 4/1899 | Werner | 136/154 |
| 2,582,845 | 1/1952 | Murphy | 136/153 |
| 2,994,626 | 8/1961 | Ruetschi | 136/154 |
| 3,172,782 | 3/1965 | Jache | 136/26 X |
| 3,309,228 | 3/1967 | Dodson et al. | 136/26 X |
| 3,402,077 | 9/1968 | Kida et al. | 136/26 X |
| 3,440,100 | 4/1969 | Gumucio et al. | 136/26 |

*Primary Examiner*—John H. Mack
*Assistant Examiner*—C. F. Lefevour
*Attorney, Agent, or Firm*—Leydig, Voit, Osann, Mayer & Holt, Ltd.

[57] ABSTRACT

A maintenance-free battery having improved current draw characteristics is provided by adding elemental cadmium, or a cadmium affording compound such as cadmium sulfate to the electrolyte in amounts sufficient to decrease the current draw that would otherwise occur during overcharge.

11 Claims, No Drawings

MAINTENANCE-FREE BATTERY AND METHOD FOR REDUCING THE CURRENT DRAW OF SUCH BATTERIES

RELATED APPLICATIONS

Mao, Ser. No. 514,023, filed Oct. 11, 1974, for: "Maintenance-Free Battery and Method for Reducing the Current Draw of Such Batteries" now abandoned; the present application being a continuation-in-part thereof.

Miller, Ser. No. 222, 611, filed Feb. 1, 1972, for: "Cover Design for Maintenance-Free Battery", now U.S. Pat. No. 3,802,597.

Mao and Rao, Ser. No. 577,463, filed May 14, 1975, for: "Lead Base Calcium-Tin Alloy and Use Thereof for Lead-Acid Battery Grid Fabrication"; a continuation of Ser. No. 403,179, filed Oct. 3, 1973, now abandoned.

Rao and Mao, Ser. No. 580,194, filed May 23, 1975, for: "Lead Base Cadmium Tin Alloy Useful for Forming Battery Components"; a continuation of Ser. No. 403,178, filed Oct. 3, 1973, now abandoned.

Mao and Lannoye, Ser. No. 536,441, filed Dec. 26, 1974, for: "Cadmium-Antimony-Lead-Alloy for Maintenance Free Lead-Acid Battery"; a continuation-in-part of Ser. No. 421,867, filed Dec. 5, 1973, now abandoned.

Mao, Rao and Trenter, Ser. No. 514,019, filed Oct. 11, 1974, for: "Maintenance-Free Battery".

This invention relates to lead-acid storage batteries and, more particularly, to maintenance-free batteries having improved current draw characteristics.

Lead base alloys have been used for storage battery plate grids for many years. The electrochemical characteristics of lead as well as its low cost make it suitable as a primary material, but alloying ingredients must be included because of the inherent physical weakness of the lead. A large number of different alloying materials in various percentages and combinations have been considered. Antimony-lead alloys containing anywhere from about 4.5 to 12% by weight antimony have been used for the preparation of the grids for lead-acid batteries. The principal function of the antimony constituent is to impart adequate grid strength as well as permitting easy casting of the grid. Lithium and combinations of lithium and tin have likewise been employed as shown in U.S. Pat. No. 3,647,545. Still further, Canadian Pat. No. 920,393 describes a lead base alloy containing cadmium and antimony for use in forming battery grids. As shown in that patent, alloying about 2.5 to 3% cadmium with 2.5% antimony in a lead alloy imparts a tensile strength considerably above that which would ordinarily be expected.

Recently, much interest has been placed upon providing automotive type, wet cell, lead-acid storage batteries in configurations which can be readily installed and which require, once in service, no further maintenance throughout the expected life of the battery. One aspect of this effort to provide such maintenance-free batteries is to utilize internal components that make it unnecessary to inspect and replenish electrolyte levels in the cells over the nornal battery life.

The achieve this maintenance-free objective, substantial elimination of water losses must be achieved. This requires that the grids employed in the maintenance-free battery draw only a small current during constant voltage overcharge so that only minimum gas generation occurs with the accompanying water loss being concomitantly minimized. With conventional automotive batteries using antimony-lead grids typically containing about 4.5% by weight antimony, the current draw at the completion of charging is unacceptably high for maintenance-free battery applications. In addition, it is known that self-discharge of a wet lead-acid battery employing an antimony alloy is caused primarily by the dissolution of antimony from the grids and its subsequent deposition on the negative plates, where it causes electrochemical reactions that discharge the lead to lead sulfate. For these reasons, the development of suitable materials for grids in maintenance-free batteries has primarily emphasized the use of lead base alloys not containing antimony.

The copending Mao and Rao application, identified herein, presents one type of alloy suitable for forming the grids of maintenance-free batteries. Thus, a lead base alloy containing, by weight, 0.06 to 0.10% calcium and 0.10 to 0.40% tin is disclosed. A further approach is described in the previously identified Rao and Mao application. This discloses a cadmium-tin-lead alloy which is useful in forming components of the battery elements, including the battery grid in a maintenance-free battery.

A still further approach is described in the herein identified Mao and Lannoye application in which a lead based alloy containing, typically, from about 1.0 to 2.0% antimony and from about 1.2 to about 2.2% cadmium is disclosed. Lead-acid battery grids can be easily cast from such an alloy, and the grids may be advantageously employed in the preparation of maintenance-free batteries to provide superior characteristics.

While such alloys do provide suitable materials for forming battery grids for use in maintenance-free battery applications, it would be highly desirable to be able to provide maintenance-free batteries in which the current draw characteristics of the grids may be further decreased.

It is accordingly an object of the present invention to provide a maintenance-free battery having exceptional current draw characteristics.

Another object provides a method for decreasing the current draw characteristics of alloys used in such applications.

A still further and more specific object of this invention lies in the provision of a maintenance-free battery employing calcium-lead or calcium-tin-lead alloy grids which possess improved current draw characteristics.

Yet another object is to provide a method of lessening the criticality of the impurities typically observed for the alloys used to form the battery grids in maintenance-free battery applications.

Other objects and advantages of the present invention will be apparent as the following description proceeds.

While the invention is susceptible of various modifications and alternative forms, specific embodiments thereof will hereinafter be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

In general, the present invention is predicated on the discovery that the addition of elemental cadmium (e.g. — as a fine powder) or a cadmium compound to the electrolyte in certain levels in a maintenance-free battery application significantly diminishes the current draw, and thus the water consumption, so as to improve the performance of the battery.

The cadmium compound which is utilized in accordance with this invention may comprise cadmium sulfate of any other cadmium compound which is: (1) sufficiently soluble in aqueous sulfuric acid solutions to provide the requisite amount of the cadmium, (2) not substantially harmful to either the battery components or to the performance of the battery in use and (3) not susceptible to producing a lead salt that would likely precipitate in sufficient amounts which would significantly reduce the porosity of the battery plates. For example, cadmium hydroxide could suitably be used.

The amount of the cadmium compound which is used should be sufficient to decrease the current draw during constant voltage overcharge. Typically, the battery at this stage will be in a fully charged condition. While the amount can vary so long as the amount of cadmium provided is sufficient to decrease the current draw to the extent required, it has been found suitable to utilize amounts in the range of from about 0.1% (or somewhat less) to about 0.3%, based upon the total weight of the electrolyte, and even up to about 0.5% by weight when the cadmium compound employed is cadmium sulfate. All that is required is for the cadmium compound to be added to the electrolyte, suitably prior to the sealing of the cover to the battery container. While it is certainly expeditious to add the cadmium affording compound directly to the electrolyte, it should be appreciated that the compound may be added to the battery in any manner so long as the resultant cadmium in the electrolyte is in the desired range. For example, the cadmium compound may be added to the electrode paste. When compounds other than cadmium sulfate are employed, the amount can desirably, of course, be varied to provide the same amount of cadmium that would be provided by the amount of cadmium in the cadmium sulfate in the range set forth herein.

With respect to the materials used to form the electrodes or battery grids, any material can be used so long as the material does not contain any impurities in an amount that would adversely affect in a significant fashion the functioning of the cadmium. For example, if an alloy containing antimony is used, the amount of antimony present should be sufficiently low so as not to completely eliminate the benefits achieved by the addition of the cadmium. Thus, it is preferred to utilize an alloy for the negative electrodes which is essentially free of antimony. More particularly, for the negative electrode, the alloy employed should not only be essentially free of antimony but should be capable of allowing the cadmium added to the electrolyte to deposit on the negative electrode during charging. Typically, it is believed suitable to use an alloy for the positive electrodes where the antimony content is no more than about 2 to 3% by weight. It is preferred to utilize calcium-lead alloys for the positive and negative grids, typically containing calcium in an amount from about 0.01 to about 0.15% by weight of the alloy and preferably about 0.06 to 0.10%. The calcium-lead alloy may, if desired, include other alloying ingredients so long as the current draw characteristics are not significantly adversely affected. It is particularly preferred to employ a lead base alloy containing about 0.06 to about 0.10% calcium, preferably 0.07–0.09%, and a tin content of about 0.1 to about 0.4%, preferably 0.20–0.30%. Alloys of this latter type have a remarkably improved resistance to drossing, thus permitting rapid casting and accurate calcium content control. Batteries prepared with grids fabricated from this alloy also have unexpectedly improved capacity retention characteristics.

It should be appreciated that such alloys can contain negligible amounts of impurities such as are typically found in commercially available battery grade lead. While impurities may be contained in the calcium and tin components, the relatively small amounts of these components make the typical impurities unimportant. Thus, as has been set forth herein, it should be appreciated that the alloys of the present invention can include other ingredients so long as they do not adversely affect the desirable features attributable to the present invention. For example, while it is preferred to utilize an alloy for the negative electrode which contains no antimony whatever, it is suitable to use an alloy which is only essentially free of antimony, i.e. — the antimony present is in such a minor amount that the cadmium added to the electrolyte is allowed to preferentially migrate to the negative electrode and deposit thereon during charging in amounts sufficient to decrease the gassing current during constant voltage overcharge of the maintenance-free battery.

The particular configuration for the battery can vary within wide limits, and the specific construction is not critical insofar as this invention is concerned. Suitable embodiments are shown in the copending Miller and Mao and Lannoye applications identified herein.

The following examples are illustrative, but not in limitation of the present invention. Unless otherwise specified, all percentages are by weight.

EXAMPLE 1

A single 70 Ampere Hour capacity cell having 6 positive and 7 negative electrodes formed of a lead based alloy having 0.08% by weight calcium and about 0.25–0.30% tin was exposed to varying cell voltages at ambient condition and at elevated temperatures. The current draw was compared for the cell having no additive (control cell) to the same cell containing 0.5% by weight cadmium in the electrolyte. An electolyte comprising sulfuric acid having a specific gravity of 1.265 was used.

The current draw characteristics at the various equilibrium voltages (i.e. —after the cell has been at the voltage charge condition for about 1 week) are set forth in Table 1 below:

TABLE I

| Part A - 80° F | | | | | | |
|---|---|---|---|---|---|---|
| Control Cell with No Additive | | | | Cell with 0.50% Cadmium in Electrolyte | | |
| | Half Cell v. Hg REF.* | | | Half Cell v. Hg REF.* | | |
| Cell Voltage | Positive | Negative | Current mA | Positive | Negative | Current mA |
| 2.35 | 1.252V | −1.098V | 24 | 1.215 | −1.135 | 10 |
| 2.45 | 1.279 | −1.171 | 54 | 1.262 | −1.188 | 40 |
| 2.55 | 1.316 | −1.234 | 176 | 1.305 | −1.244 | 158 |
| Part B - 125° F | | | | | | |
| 2.30 | 1.191 | −1.109 | 65 | 1.172 | −1.123 | 46 |

TABLE I-continued

Part A - 80° F

| | Control Cell with No Additive | | | Cell with 0.50% Cadmium in Electrolyte | | |
|---|---|---|---|---|---|---|
| | Half Cell v. Hg REF.* | | | Half Cell v. Hg REF.* | | |
| Cell Voltage | Positive | Negative | Current mA | Positive | Negative | Current mA |
| 2.35 | 1.152 | −1.198 | 102 | 1.132 | −1.218 | 74 |
| 2.45 | 1.191 | −1.259 | 296 | 1.173 | −1.277 | 246 |
| 2.55 | 1.231 | −1.318 | 1,020 | 1.211 | −1.338 | 880 |

*These values were all determined experimentally.

EXAMPLE 2

Two Group 24 maintenance-free batteries having capacities of 81 Ampere Hours were tested to show the effects of the inclusion of a cadmium compound in accordance with the present invention on the current draw characteristics of the batteries. Two different charge voltages were used, and the grids were formed of the lead base alloys described in Example 1. The gassing current draw was then measured after the batteries had been on charge conditions overnight. The results are shown in Table 2:

TABLE 2

| | BATTERY NO. 1 CHARGE VOLTAGE | | BATTERY NO. 2 CHARGE VOLTAGE | |
|---|---|---|---|---|
| Additive Concentration | 14.40V | 14.10V | 14.40V | 14.10V |
| None | 185 mA at 108° F | 120 mA at 108° F | 170–179 mA at 108° F | 110 mA at 108° F |
| 0.1% CdSO$_4$ | 110 mA at 108° F | 73 mA at 108° F | 105 mA at 108° F | 65 mA at 108° F |
| 0.3% CdSO$_4$ | 145 mA at 108° F | 90 mA at 107.5° F | 128 mA at 108° F | 90 mA at 107.5° F |

EXAMPLE 3

A number of the Group 24 batteries described in the previous example were subjected to tests at higher temperatures with varying amounts of additives and were tested as described in the previous example. The results are shown in Table 3:

TABLE 3

| | BATTERY NUMBER* | | | | | | | | |
|---|---|---|---|---|---|---|---|---|---|
| | 1 | | 2 | | 3 | 4 | | 5 | |
| | 14.10V | 14.40V | 14.10V | 14.40V | 14.10V | 14.50V | 15.00V | 14.50V | 15.00V |
| No additive | 170 mA | 260 mA | 140 mA | 200 mA | 95 mA | 70 mA | 110 mA | 70 mA | 110 mA |
| 0.1% CdSO$_4$ | 110 mA | 180 mA | — | 150 mA | 75 mA | 60 mA | 110 mA | 50 mA | 100 mA |
| 0.5% CdSO$_4$ | 190 mA | 250 mA | — | — | — | — | — | — | — |

*All current measurements for battery numbers 1 - 3 were at 125° F., and the measurements for battery numbers 4 and 5 were at 69° F. except for the 15.00V measurements for battery number 5 which were taken at 67° F.

Thus, as has been seen, the present invention provides a maintenance-free battery which is characterized by improved gassing current characteristics. As is also illustrated in Example 1, the inclusion of suitable amounts of the cadmium in accordance with the present invention results in a significantly more electronegative electrode. It should also be noted that the current draw values taken at equilibrium conditions in Example 1 may be more representative of the improvement that can be achieved pursuant to this invention rather than the values taken prior to reaching equilibrium, as in Examples 2 and 3.

I claim:

1. In a maintenance-free lead-acid battery comprising a battery container having a plurality of cells, a cover sealed to the container, venting means providing passages for the escape of evolved gas and an electrolyte contained in the cells, each cell including a plurality of positive and negative electrodes disposed therein comprising a grid supporting structure having a layer of active material attached thereto, the improvement wherein said electrolyte contains an additive consisting of cadmium or a cadmium compound in an amount sufficient to decrease the gassing current during constant voltage overcharge of said maintenance-free battery, the amount of cadmium corresponding to that provided by from about 0.1 to about 0.5% cadmium sulfate, based upon the weight of the electrolyte, and at least the grid supporting structure for the negative electrode consisting of an alloy essentially free of antimony and capable of allowing the cadmium added to deposit on the negative electrode during charging in amounts sufficient to decrease the gassing current during constant voltage overcharge of the maintenance-free battery.

2. The maintenance-free battery of claim 1 wherein the cadmium is provided by the addition of cadmium sulfate to the electrolyte.

3. The maintenance-free battery of claim 1 wherein at least the grid supporting structure of the negative electrodes consists essentially of a lead base alloy containing calcium in an amount of from about 0.01 to about 0.15%, based upon the weight of the alloy.

4. The maintenance-free battery of claim 3 wherein at least the grid supporting structure of the negative electrodes consists essentially of a lead base alloy containing from about 0.01 to about 0.15% calcium and from about 0.1 to about 0.4% tin, based upon the weight of the alloy.

5. The maintenance-free battery of claim 4 wherein said lead base alloy contains calcium in an amount of 0.07 to 0.09% and tin in an amount of 0.20 to 0.30%.

6. In a maintenance-free lead-acid battery comprising a battery container having a plurality of cells, a cover sealed to the container, venting means providing passages for the escape of evolved gas and an electrolyte contained in the cells, each cell including a plurality of positive and negative electrodes disposed therein comprising a grid supporting structure having a layer of active material attached thereto, the improvement wherein said electrolyte contains an additive consisting of cadmium or a cadmium compound in an amount sufficient to decrease the gassing current during constant voltage overcharge of said maintenance-free battery, the amount of cadmium corresponding to that provided by from about 0.1 to about 0.5% cadmium sulfate, based upon the weight of the electrolyte, and at least the grid supporting structure for the negative electrode consists of a lead-calcium alloy.

7. A method of reducing the gassing current during constant voltage overcharge in a maintenance-free battery comprising a battery container having a plurality of cells each including a plurality of positive and negative electrodes disposed therein comprising a grid supporting structure having a layer of active material attached thereto and an electrolyte contained in the cells which comprises adding an additive consisting of cadmium or a cadmium compound to said electrolyte in an amount sufficient to decrease the gassing current during constant voltage overcharge, the amount of cadmium corresponding to that provided by from about 0.1 to about 0.5% cadmium sulfate, based upon the weight of the electrolyte, and at least the grid supporting structure for the negative electrode consisting of an alloy essentially free of antimony and capable of allowing the cadmium added to deposit on the negative electrode during charging in amounts sufficient to decrease the gassing current during constant voltage overcharge of the maintenance-free battery.

8. The method of claim 7 wherein said cadmium is provided by the addition of cadmium sulfate.

9. The method of claim 7 wherein at least the grid supporting structure of the negative electrodes consists essentially of a lead base alloy containing calcium in an amount of from about 0.01 to about 0.15%, based upon the weight of the alloy.

10. The method of claim 9 wherein at least the grid supporting structure of the negative electrodes consists essentially of a lead base alloy containing calcium in an amount of from about 0.01 to about 0.15% and tin in an amount of from about 0.10 to about 0.40%, based on the weight of the alloy.

11. A method of reducing the gassing current during constant voltage overcharge in a maintenance-free battery comprising a battery container having a plurality of cells each including a plurality of positive and negative electrodes disposed therein comprising a grid supporting structure having a layer of active material attached thereto and an electrolyte contained in the cells which comprises adding an additive consisting of cadmium or a cadmium compound to said electrolyte in an amount sufficient to decrease the gassing current during constant voltage overcharge, the amount of cadmium corresponding to that provided by from about 0.1 to about 0.5% cadmium sulfate, based upon the weight of the electrolyte, and at least the grid supporting structure for the negative electrode consists of a lead-calcium alloy.

* * * * *